United States Patent
King (10) Patent No.: US 7,656,956 B2
(45) Date of Patent: Feb. 2, 2010

(54) DATA, POWER AND SUPERVISORY SIGNALING OVER TWISTED PAIRS

(75) Inventor: Nigel J. R. King, South Brent (GB)

(73) Assignee: Motorola, Inc., Schaumburg, IL (US)

( * ) Notice: Subject to any disclaimer, the term of this patent is extended or adjusted under 35 U.S.C. 154(b) by 692 days.

(21) Appl. No.: 11/251,383

(22) Filed: Oct. 14, 2005

(65) Prior Publication Data

US 2006/0159186 A1   Jul. 20, 2006

Related U.S. Application Data

(60) Provisional application No. 60/644,280, filed on Jan. 14, 2005.

(51) Int. Cl.
*H04B 3/00* (2006.01)

(52) U.S. Cl. .................. 375/257; 375/259; 713/300; 370/254; 370/257; 370/419; 370/487; 370/490; 370/442

(58) Field of Classification Search .................. 375/257, 375/259; 713/300; 307/254, 257, 395, 487, 307/490, 419, 442
See application file for complete search history.

(56) References Cited

U.S. PATENT DOCUMENTS

| | | | |
|---|---|---|---|
| 6,115,468 A * | 9/2000 | De Nicolo | 379/413 |
| 6,140,911 A * | 10/2000 | Fisher et al. | 375/258 |
| 6,185,263 B1 | 2/2001 | Chan | |
| 6,295,356 B1 | 9/2001 | De Nicolo | |
| 6,329,906 B1 * | 12/2001 | Fisher et al. | 375/258 |
| 6,507,608 B1 | 1/2003 | Norrell | |
| 6,640,308 B1 * | 10/2003 | Keyghobad et al. | 713/300 |
| 6,715,087 B1 | 3/2004 | Vergnaud | |
| 2002/0063584 A1 | 5/2002 | Molenda | |
| 2006/0115007 A1 * | 6/2006 | Karam et al. | 375/257 |

OTHER PUBLICATIONS

Power Over Ethernet: Cisco Inline Power and IEEE 802.3; Cisco Systems, Inc.; 1992-2004; pp. 1-13.
IEEE802.3poep Study Group; Power Feeding Methods; Yair Darshan; PowerDsine; Mar. 2005; pp. 1-36.
IEEE Standards 802.3af; Part 3: Carrier Sense Multiple Access with Collision Detection (CSMA/CD) Access Method and Physical Layer Specifications; Sponsored by LAN/MAN Standards Committee; IEEE 2003.
PCT Search Report dated Aug. 5, 2006.
PCT Search Report Dated May 8, 2006.
GBR Rejection Dated Dec. 1, 2008.

* cited by examiner

*Primary Examiner*—David C Payne
*Assistant Examiner*—Zewdu Kassa
(74) *Attorney, Agent, or Firm*—Anthony P. Curtis (57) ABSTRACT

A system and method for conveying supervisory signaling and power over the same twisted wire pairs in a cable as are used to carry data communications in accordance with a predetermined communications protocol. Supervisory signals having first and second differential components are generated. The first component is coupled to both wires of one of the twisted wire pairs as a common mode signal and the second component of the supervisory signal is coupled to both wires of another twisted pair as a common mode signal. The first and second components are recovered at the remote end of the cable. Physical interfaces are AC coupled to the respective twisted pairs at both ends of the cable and positive and negative voltage rails powered by a power sourcing device are coupled to predetermined twisted pairs to convey a DC voltage over the cable which may be used to power a remote electronic device.

45 Claims, 3 Drawing Sheets

DATA, POWER AND SUPERVISORY SIGNALING OVER TWISTED PAIRS

CROSS REFERENCE TO RELATED APPLICATIONS

This application claims priority of U.S. Provisional Patent Application No. 60/644,280 filed Jan. 14, 2005 entitled POWER AND SUPERVISORY SIGNALLING OVER 1000BASE-T ETHERNET.

STATEMENT REGARDING FEDERALLY SPONSORED RESEARCH OR DEVELOPMENT

N/A

BACKGROUND OF THE INVENTION

The present invention relates generally to data communication and more specifically to the provision of supervisory signaling and power over the same twisted pairs as are employed for data signaling in accordance with a high speed data communication protocol.

Data communication over 100BASE-T and 1000BASE-T in accordance with the Ethernet protocols are well known. Using these protocols, Ethernet signals may be transmitted over twisted pairs such as CAT5, CAT 5e, CAT6 or any similar cable that includes four twisted pairs. The twisted pairs may be shielded or unshielded. A separate Ethernet signal is typically transmitted over each of the twisted pairs as a differential signal. In a 1000BASE-T Ethernet system, the lowest frequency that must be passed over an Ethernet pair unimpaired is 100 kHz.

While the use of cabling such as CAT5 permits the transmission of four Ethernet signals over the four twisted pairs, numerous circumstances arise in which it would be desirable to provide additional signaling capabilities and to supply power to a remote device without incurring the expense associated with the procurement and installation of additional wiring.

BRIEF SUMMARY OF THE INVENTION

In accordance with the present invention, a system and method for providing power and supervisory control signaling over four twisted pairs is disclosed. More specifically, in one embodiment, power and supervisory control signaling are provided over the same twisted pairs that carry Ethernet communications using 1000BASE-T signaling (1 gigabit Ethernet), 100BASE-T signaling (100 megabit Ethernet) or 10 BASE-T signaling (10 megabit Ethernet).

High speed data signals from the Ethernet PHY devices are coupled to each of first, second, third and fourth twisted pairs in a manner that DC isolates the PHYs from the respective twisted pairs. In particular, the PHYs may be coupled to the twisted pairs capacitively or via a coupling transformer. First and second signaling transformers, each having a primary winding and a center-tapped secondary winding, are provided for coupling power and supervisory control signals to the first and second twisted pairs and the third and fourth twisted pairs respectively as is explained in greater detail below.

The ends of a center-tapped inductor are coupled to the wires of each twisted pair on the wire side of the coupling capacitors or coupling transformer at each end of the twisted pair. The ends of the secondary winding of each signaling pair are coupled to the center-taps of the center-tapped inductors. For example, one end of the secondary winding of the first signaling transformer is coupled to the center-tap of the inductor that is connected to the wires of the first twisted pair so as to couple the signal on the first end of the first signaling transformer in common mode to both wires of the first twisted pair. Similarly, the second end of the secondary of the first signaling transformer is coupled to the center-tap of the inductor that has its ends connected to the wires of the second twisted pair so as to couple the signal on the second end of the secondary winding of the signaling transformer to both wires of the second twisted pair as a common mode signal. Accordingly, the first supervisory signal does not affect the differential high speed Ethernet signals that are communicated over the first and second twisted pairs.

Similar connections are made using the second signaling transformer and inductors coupled between the wires of the third and fourth twisted pairs to superimpose a second supervisory signal on the third and fourth twisted pairs. The second supervisory signal likewise does not affect the differential high speed Ethernet signals that are communicated over the respective third and fourth twisted pairs.

A DC power source having first and second voltage rails is connected at one end of the cable in such a manner as to make the DC output voltage available to power circuitry at the other end of the cable. More specifically, the first voltage rail or the power source is connected to the center tap of the secondary winding of the first signaling transformer and the second voltage rail of the power source is connected to the center tap of the secondary winding of the second signaling transformer. Thus, the voltage on the first volage rail is conveyed over both wires of both the first and second twisted pairs, and the voltage on the second voltage rail is conveyed over both wires of both the third and fourth twisted pairs.

The same circuit configuration is employed at both ends of the four twisted pairs to permit recovery of the supervisory signals and DC power in addition to the four Ethernet signals communicated over the twisted pairs. Additionally, since the same circuit configuration is employed at both ends, bidirectional communication via the supervisory signals is possible and power may be sourced at either end of the cable.

Other features, aspects and advantages of the presently disclosed method and system for providing power and supervisory signaling over four twisted pairs that are used for high speed data communication signaling will be apparent to those of ordinary skill in the art from the following Detailed Description of the Invention.

BRIEF DESCRIPTION OF THE SEVERAL VIEWS OF THE DRAWINGS

The invention will be more fully understood by reference to the following Detailed Description of the Invention in conjunction with the drawings of which.

DETAILED DESCRIPTION OF THE INVENTION

The present application incorporates by reference the entirety of the disclosure of U.S. Provisional Patent Application No. 60/644,280 filed Jan. 14, 2005 and entitled POWER AND SUPERVISORY SIGNALLING OVER 1000BASE-T ETHERNET.

Figure 1:
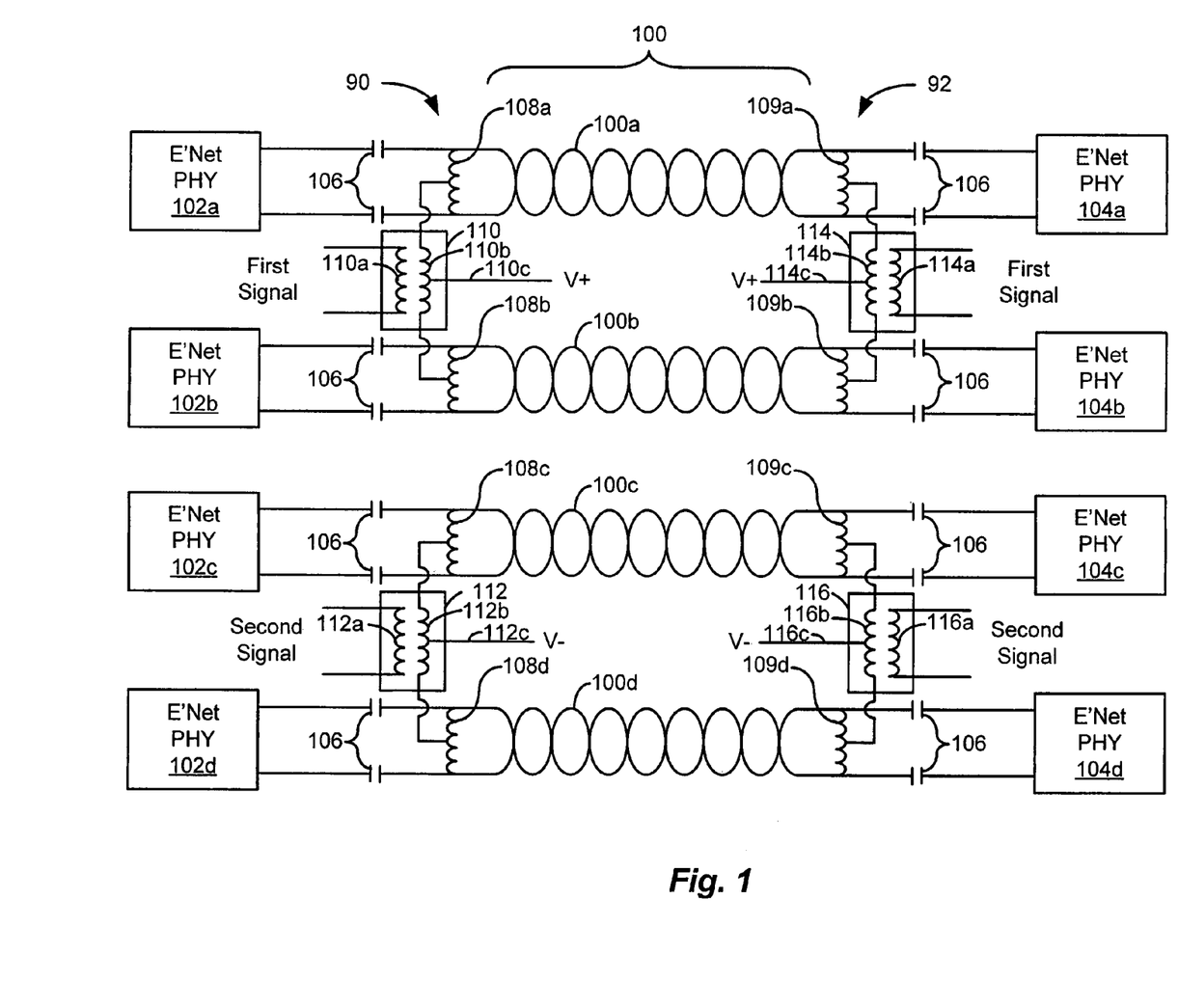
FIG. 1 is a circuit diagram depicting one embodiment of the presently disclosed circuit and system for communicating data and providing power and supervisory signaling over twisted pairs in which Ethernet PHYs and magnetic interfaces are generally co-located at respective ends of the communication cable.

A system and method for providing supervisory signaling and power over the same twisted pairs that are employed for data communications in accordance with a predetermined data communications protocol is disclosed. FIG. 1 depicts a system in which Ethernet PHYs and interface magnetics are generally co-located at respective ends of a communication cable 100. The cable 100 includes four twisted pairs that extend between a magnetic interface 90 at a first end of the cable 100 and a magnetic interface 92 at a second end of the cable as depicted in FIG. 1. The magnetic interfaces 90 and 92 provide an interface for coupling power and supervisory signaling to the twisted pairs within the cable at one end of the cable and for recovering power and supervisory signaling at the other end of the cable 100.

The Ethernet PHYs may be integrated into a computer, network device, Ethernet appliance or the like along with the magnetic interfaces 90, 92 as illustrated in FIG. 1. Alternatively, as depicted and later discussed in connection with FIG. 3, the Ethernet PHYs may be integrated into a computer, network device, Ethernet appliance or the like and the magnetic interfaces may be spaced from the computer, network device, Ethernet appliance, etc and coupled by a communication cable at one or both ends. In the embodiment depicted in FIG. 1, in compliance with the 1000BASE-T standard, the length of the cable 100 is no greater than a predetermined distance, e.g. 100 meters.

Referring to FIG. 1, the cable 100 includes first, second, third and fourth twisted pairs 100a, 100b, 100c, and 100d (which may be shielded or unshielded) for carrying four high speed data signals, such Ethernet signals using the 100BASE-T or 1000BASE-T signaling protocols. The Ethernet signals are generated and received by Ethernet physical interfaces (PHYs) 102a-102d, 104a-104d as known in the art. When the Ethernet protocol comprises a gigabit Ethernet protocol compliant with the 100BASE-T specifications, the data transfer rate across the four twisted pairs is equal to 1 gigabit. As is known, in 1000BASE-T systems (gigabit Ethernet) a gigabit signal is segmented into four signal components and each of the four signal components is transmitted over one of the four twisted pairs within the cable 100 from a transmit side interface. The signal transmitted over each twisted pair is transmitted at approximately 250 megabits/second to achieve a 1 gigabit/second data transfer rate in the aggregate. Ethernet signals may be transmitted over the respective twisted pairs bi-directionally. The Ethernet signals that are transmitted and received by the Ethernet PHYs are capacitively coupled to both wires of the first, second, third and fourth twisted pairs 100a-100d via coupling capacitors 106. The four signal components are received at a receive side interface and combined to obtain the original gigabit signal.

One magnetic interface 90 at the first end of the cable 100 includes center-tapped inductors 108a and 108b and a transformer 110. This magnetic interface is coupled to the first and second twisted pairs 100a and 100b. Another magnetic interface 90 at the first end of the cable 100 includes center-tapped inductors 108c and 108d and a transformer 112. This magnetic interface is coupled to the third and fourth twisted pairs 100c and 100d.

Similarly at the second end of the cable a magnetic interface 92 includes center-tapped inductors 109a and 109b and a transformer 114. This magnetic interface is coupled to the first and second twisted pairs 100a and 100b. Additionally, another magnetic interface 92 includes center-tapped inductors 109c and 109d and a transformer 116. This magnetic interface is coupled to the third and fourth twisted pairs 100c and 100d as depicted in FIG. 1.

Center-tapped inductors 108a-108d are coupled between the wires of the twisted pairs 100a-100d respectively on the twisted pair side of the coupling capacitors 106 at a first end of the cable 100 and center-tapped inductors 109a-109d are coupled between wires of the twisted pairs 100a-100d on the twisted pair side of the coupling capacitors 106 at a second end of the cable 100 as depicted in FIG. 1.

First and second signals, such as supervisory, control or monitor signals (referred to herein generally as a "supervisory signal"), are applied to first and second transformers 110, 112 as illustrated in FIG. 1. The transformers 110, 112 have primary windings 110a, 112a, secondary windings 110b, 112b and center-taps 110c, 112c on the secondary windings 110b, 112b.

One end of the secondary winding 110b of the first transformer 110 is coupled to the center-tap of the center-tapped inductor 108a which spans the wires of the first twisted pair 100a at the first end of the cable 100. The other end of the secondary winding 110b is coupled to the center-tap of the inductor 108b which spans the wires of the second twisted pair 100b at the first end of the cable 100. Thus, the signal applied to the center-tap of the inductor 108a is coupled to both wires in the twisted pair 100a as a common mode signal. Similarly, the signal that is applied to the center-tap of the inductor 108b is coupled to both wires of the twisted pair 100b as a common mode signal. Thus, differential receivers within the PHYs 104a, 104b are not affected by the coupling of the differential components of the first signal to both wires of the first and second twisted pairs 100a, 100b.

Additionally, a second supervisory signal is superimposed on the third and fourth twisted pairs in the manner discussed above with respect to the first signal. More specifically, the second signal is applied to the primary of the second transformer 112. One end of the secondary winding 112b of the second transformer 112 is coupled to the center-tap of the center-tapped inductor 108c which spans the wires of the third twisted pair 100c at the first end of the cable 100 and the other end of the secondary winding 112b is coupled to the center-tap of the inductor 108d which spans the wires of the second twisted pair 100d at the first end of the cable 100 as depicted in FIG. 1. Thus, the component of the second signal applied to the center-tap of the inductor 108c is coupled to both wires of the third twisted pair 100c as a common mode signal. Similarly the component of the second signal that is applied to the center-tap of the inductor 108d is coupled to both wires of the twisted pair 100d as a common mode signal. Thus, differential receivers within the PHYs 104c, 104d are not affected by the coupling of the differential components of the second signal to both wires of the third and fourth twisted pairs 100c, 100d.

The circuitry at the second end 92 of the cable is coupled to the four twisted pairs 100a-100d in the same manner as described above with respect to the first end 90. More specifically, Ethernet PHYs 104a-104d are coupled to the respective twisted pairs 100a-100d via coupling capacitors 106. Center-tapped inductors 109a-109d are coupled between the wires of the respective twisted pairs 100a-100d on the cable side of the coupling capacitors 106. Transformers 114 and 116 include primary windings 114a, 116a and secondary windings 114b, 116b. The secondary windings 114b, 116b have respective center-taps 114c, 116c.

One end of the secondary winding 114b is coupled to the center-tap of the inductor 109a at the second end of the cable 100a. The other end of the second winding 114b is coupled to the center-tap of inductor 109a that is connected to both wires of the second twisted pair 100b at the second end 92 of the cable 100.

One end of the secondary winding 116b is coupled to the center-tap of the inductor 109c that is connected between the two wires of the third twisted pair 100c at the second end 92 of the cable 100. The other end of the secondary winding 116b is coupled to the center-tap of inductor 109d that is connected to both wires of the fourth twisted pair 100d at the second end 92 of the cable 100.

The operation of the circuitry and system is generally as described below.

Ethernet PHYs 102a and 104a, 102b and 104b, 102c and 104c, and 102d and 104d transmit and receive Ethernet packets over twisted pairs 100a-100d respectively. Ethernet PHYs 102a-102d and 104a-104d are capacitively coupled to the twisted pairs 100a-100d via the coupling capacitors 106. The Ethernet PHYs 102a-102d and 104a-104d include differential drivers and receivers for differential transmission and reception over the balanced twisted pairs, and thus do not react to common mode signals appearing on both wires of any given twisted pair.

The first signal, such as the first supervisory or control signal, is applied to the primary winding 110a of the transformer 110. One end of the secondary winding 110b is coupled to the center-tap of the inductor 108a and the other end of the secondary winding 110b is coupled to the center-tap of the inductor 108b. By reason of the use of the center-tapped inductors 108a and 108b, the signal appearing on the center-tap of the inductor 108a is superimposed on the Ethernet signal communicated over both wires of the first twisted pair 100a as a common mode signal. Similarly, the signal appearing on the center-tap of the inductor 108b is superimposed on the Ethernet signal communicated over both wires of the second twisted pair 100b as a common mode signal.

Power is supplied over the 4 twisted pairs as described below.

A first voltage rail of a power source or supply (not shown) is coupled to the center-tap 110c of the secondary winding 110b of the first transformer 110 and a second voltage rail of the power source or supply is coupled to the center-tap 112c of the secondary winding 112b of the second transformer 112 at the first end 90 of the cable 100. The voltage on the first voltage rail is DC coupled through the secondary winding 110b and the inductors 108a and 108b to both wires of the first and second twisted pairs 100a, 100b. At the second end 92 of the cable 100, the voltage from the first voltage rail is coupled through the center-tapped inductors 109a and 109b and through the secondary winding 114b to the secondary winding center-tap 114c.

The voltage on the second voltage rail is DC coupled through the secondary winding 112b and the inductors 108c and 108d to both wires of the third and fourth twisted pairs 100c, 100d. At the second end 92 of the cable 100, the voltage from the second voltage rail is coupled through the center-tapped inductors 109d and 109d and through the secondary winding 116d to the secondary winding center-tap 116c. Power is thereby available at the second end 92 of the cable between the voltage from the first voltage rail appearing on the center-tap 114c of the secondary winding 114b and the voltage on the second voltage rail appearing on the center-tap 116c of the secondary winding 116b.

The differential signal between the signals on the center-tap of the inductor 109a and 109b corresponds to the first signal input at the primary winding 110a. This differential signal is ac coupled from the winding 114b to the winding 114a and is available for control or monitoring purposes at the second end 92 of the cable. The first signal may comprise a binary data signal or any other suitable signal for conveying data from the first end 90 of the cable 100 to the second end 92 of the cable 100.

Similarly, the differential signal between the signals on the center-tap of the inductor 109c and 109d corresponds to the second signal input at the primary winding 112a. This differential signal is ac coupled from the winding 116b to the winding 116a and is available for control or monitoring purposes at the second end 92 of the cable. The second signal may also comprise a binary data signal or any other suitable signal for conveying data from the first end 90 of the cable 100 to the second end 92 of the cable 100.

The cable 100 may comprise a CAT5 cable, a CAT5e cable, a CAT6 cable or any other suitable cable containing twisted pairs which may be shielded or unshielded.

Figure 2:
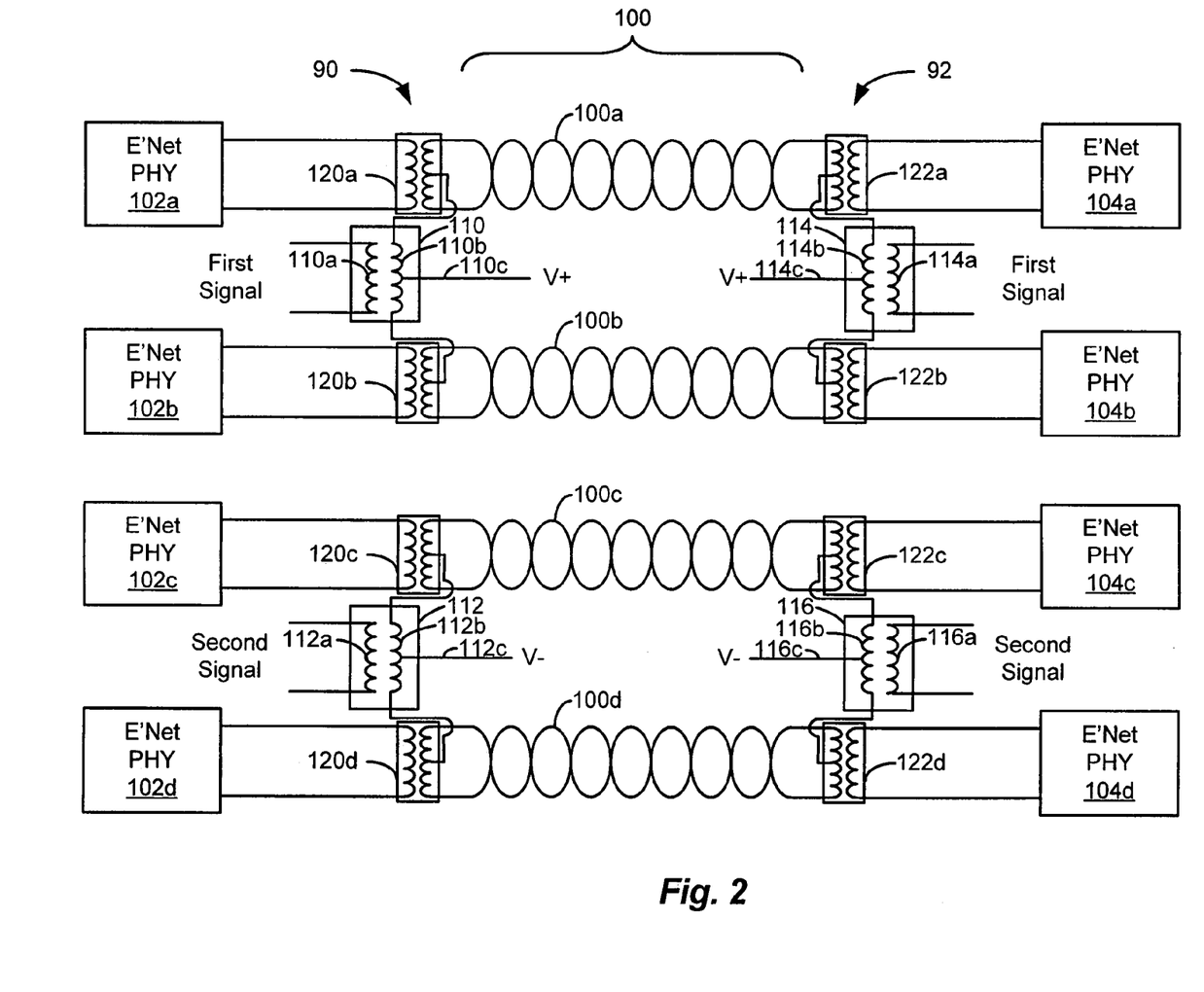
FIG. 2 is a circuit diagram depicting another embodiment of the circuit and system for communicating data and providing power and supervisory signaling over twisted pairs.

The PHYs may alternatively be DC isolated from the twisted pairs either at one end or at both ends of the cable 100 using coupling transformers 120a-120d and coupling transformers 122a-122d as illustrated in FIG. 2. In this circumstance, the center-tapped inductors 108a-108d and 109a-109d discussed in connection with FIG. 1 form the secondary winding of the transformers 120a-120d and 122a-122d with the primary winding of the coupling transformers coupled to the respective PHYs. It should also be appreciated that capacitive coupling of the PHYs may be employed at one end of the cable and transformer coupling of the PHYs may be employed at the other end of the cable.

While in the above-described example, signaling is described as being from the first end of the cable to the second end of the cable, it should be recognized that the signals may sourced at either end of the cable 100. Additionally, the first signal may be sourced at one end of the cable 100 and the second signal may be sourced at the other end of the cable.

Multiple signals may be carried over the path traversed by the first signal or the second and the respective signals may be transmitted in both directions as the circuits at both ends are generally symmetrical. For example, signals having different frequencies may be transmitted over the path traversed by the first signal or the second signal and may be transmitted in the same or opposite directions. More specifically, using one supervisory signaling channel, a first signal having a 50 khz carrier may be transmitted over the channel and modulated on and off to provide binary signaling. Additionally, a second signal having a 1.6 megahertz carrier may be transmitted over the same supervisory channel and modulated on and off to provide binary signaling for the second signal. Thus, in the instant example, the first and second signals are multiplexed over the first supervisory channel. It should be recognized that the frequencies may be varied based on specific design objectives. Other signaling techniques may also be employed to multiplex signaling over one or both supervisory signaling channels.

Figure 3:
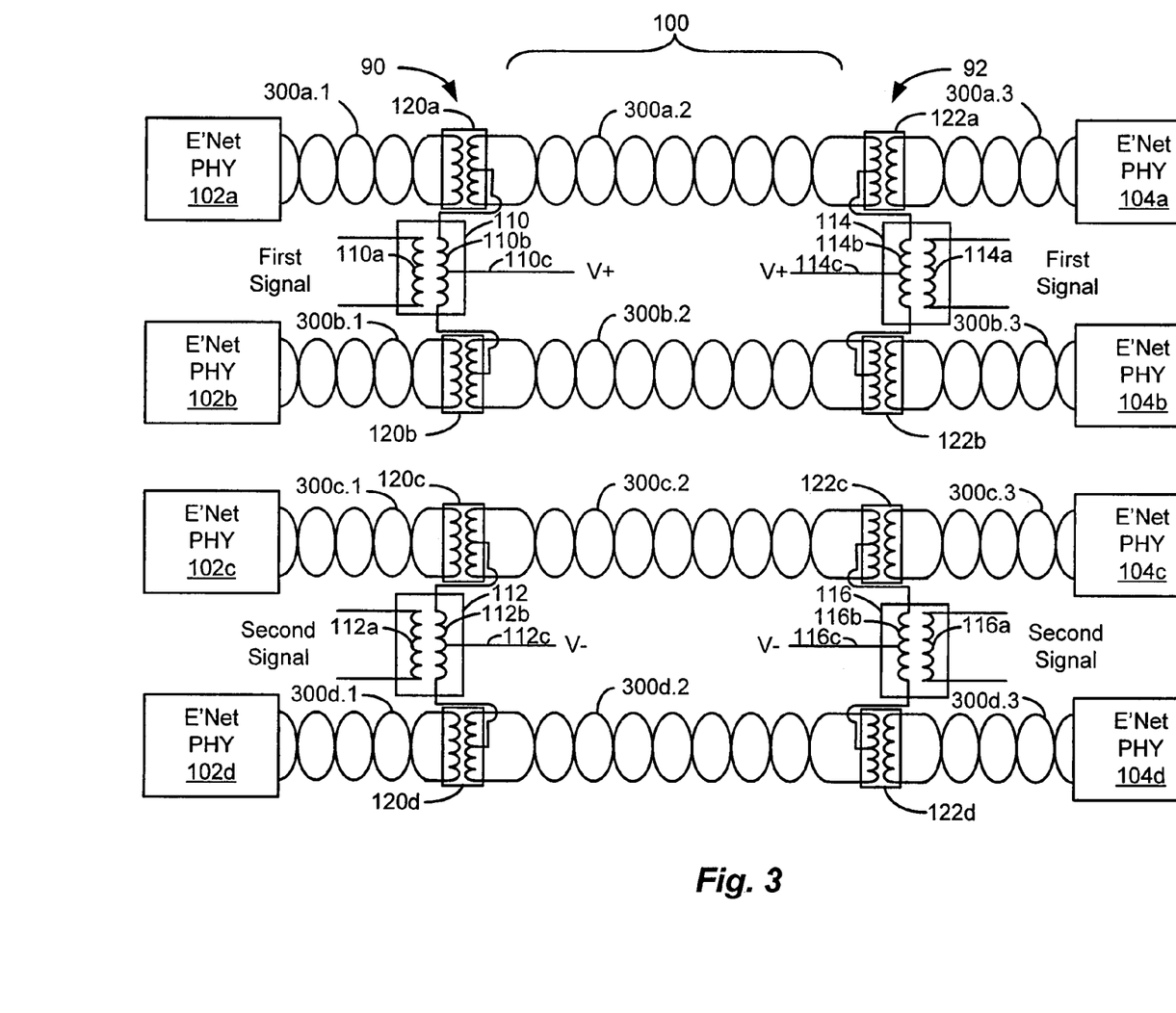
FIG. 3 is a circuit diagram depicting another embodiment of the presently disclosed circuit and system for communicating data and providing power and supervisory signaling over twisted pairs in which Ethernet PHYs and magnetic interfaces are not co-located at respective ends of the communication cable.

The embodiment illustrated in FIG. 3 depicts a system in which the magnetic interfaces are spaced from the respective PHYs and are coupled to the PHYs via the communication cable. By way of example, in a 1 system operative in accordance with the 1000 BASE-T standard, the maximum length of the communication cable 200 between the respective PHYs is 100 meters. Accordingly, the total of the lengths of the cable portions 300a.1, 300a.2 and 300a.3 would need to be no greater than 100 meters. Similarly, the total of the lengths of the cable portions 300b.1, 300b.2 and 300b.3 would need to be no greater than 100 meters, the total of the lengths of the cable portions 300c.1, 300c.2 and 300c.3 would need to be no greater than 100 meters and the total of the lengths of the cable portions 300d.1, 300d.2 and 300d.3 would need to be no greater than 100 meters. Otherwise, the description of the circuitry of Fig. is the same as discussed above with respect to FIG. 1.

By spacing the magnetic interfaces from the PHYs, the PHY may be incorporated into a computer, network device or appliance and the magnetic interface may be fabricated external to the device. Accordingly, in this embodiment, there is no need to couple a power supply (such as a 48V power supply) or supervisory signal source to the computer, network device or Ethernet appliance that houses the respective PHY.

While FIG. 3 depicts magnetic interfaces coupled to respective PHYs via communication cables (4 twisted pairs) at each end, it should be recognized that at either end of the communication system, the respective PHYs may be directly coupled to the magnetic interfaces as depicted in FIG. 1 or alternatively, spaced therefrom and coupled via a communication cable as illustrated in FIG. 3.

Similarly, at the destination or unpowered end, the supervisory signaling and/or power can be recovered and employed to perform control functions, control light emitting diodes (LEDs) or to perform other control or monitoring functions. As illustrated in FIG. 3 the magnetic interfaces may be provided at intermediate points of the cable and power and signaling may thus be provided or recovered at such intermediate points.

While in the illustrated embodiments the physical interfaces (PHYs) are DC isolated from the respective twisted pairs via isolation capacitors, it should be recognized that DC isolation may alternatively be achieved via the use of transformers between the PHYs and the twisted pairs.

It should also be appreciated that the presently disclosed system may be employed to provide power over Ethernet without supervisory signaling capabilities. In such event, the transformers 110, 112, 114 and 116 could be omitted and the voltage rails or voltage outputs, as applicable, coupled directly to the center-taps of the inductors 108a, 108b, 108c, 108d, 109a, 109b, 109c and 109d. By way of example, if supervisory signaling is not necessary, the voltage rail V+ may be connected directly to the center-tap of the inductor 108a if power is conveyed over two wires and the voltage rail V+ may be connected to the center-tap of inductors 108a and 108b if power is conveyed over four wires. Similarly, the voltage rail V− may be connected directly to the center-tap of the inductor 108c if power is conveyed over two wires and the voltage rail V− may be connected to the center-tap of inductors 108c and 108d if power is conveyed over four wires.

With respect to the outputs, if supervisory signaling is not employed, the positive output rail V+ may be connected to the center-tap of the inductor 109a if power is conveyed over two wires and may be connected to the center-taps of both inductors 109a and 109b if power is conveyed over four wires. Similarly, the negative output rail V− may be connected to the center-tap of the inductor 109c if power is conveyed over two wires and may be connected to the center-taps of both inductors 109c and 109d if power is conveyed over four wires.

It should also be appreciated that other modifications to and variations of the above-described system and method for providing supervisory signaling and power over the same twisted pairs that are utilized for data signaling in accordance with a predetermined data communication protocol may be made without departing from the inventive concepts described herein. Accordingly, the invention should not be viewed as limited except by the scope and spirit of the appended claims.

What is claimed is:

1. A method of transmitting supervisory signals and providing power over a cable having first and second ends, said cable including at least first and second twisted pairs, said method comprising the steps of:
   ac coupling physical interfaces operative in accordance with a predetermined data communication protocol to each of said twisted pairs at one end of said cable to permit data communication over the respective twisted pair via said predetermined protocol;
   generating first and second differential signal components from a first supervisory signal, wherein said first and second differential components are DC isolated from said first supervisory signal;
   coupling said first differential signal component to both wires of said first twisted pair at said first end of said cable such that said first differential signal component is superimposed on both wires of first twisted pair as a first common mode signal; and
   coupling said second differential signal component to both wires of said twisted pair at said first end of said cable such that said second differential signal component is superimposed on both wires of said second twisted pair as a second common mode signal,
   wherein said step of generating said first and second differential signal components comprises the steps of coupling said first supervisory signal to a primary winding of a first signaling transformer having said primary winding and a center-tapped secondary winding, and obtaining said first and second differential signal components from respective ends of said secondary winding of said first signaling transformer,
   wherein said cable includes at least one additional wire, said method further including the steps of:
   coupling a first rail of a power supply having first and second voltage rails to both wires of said first and second twisted pairs at said one end of said cable; and
   coupling said second rail of said power supply to said at least one additional wire at said one of said first and second ends of said cable, and
   wherein said cable further includes third and fourth twisted pairs and said first power supply rail coupling step comprises the step of coupling said first power supply rail to said center-tap of said secondary winding of said first signaling transformer to dc couple said first power supply rail to both wires of said first and second twisted pairs and said second power supply rail coupling step comprises the step of coupling said second power supply rail to a center-tap of a secondary winding of a second signaling transformer to dc couple said second power supply rail to both wires of said third and fourth twisted pairs, said second signaling transformer having said center-tapped secondary winding and a primary winding, said secondary winding of said second transformer having respective ends coupled to center-taps of third and fourth inductors, said third and fourth inductors having respective ends coupled to the wires of said third and fourth twisted pairs respectively.

2. The method of claim 1 wherein said predetermined data communication protocol comprises gigabit Ethernet.

3. The method of claim 1 wherein said predetermined data communication protocol comprises 100 megabit Ethernet.

4. The method of claim 1 wherein said predetermined data communication protocol comprises 10 megabit Ethernet.

5. The method of claim 1 wherein said at least one additional wire comprises third and fourth twisted pairs and said second rail coupling step comprises the step of coupling said second rail of said power supply to both wires of said third and fourth twisted pairs at said one of said first and second ends of said cable.

6. The method of claim 1 wherein said ac coupling step comprises the step of coupling each of said physical interfaces to a corresponding twisted pair via a data coupling transformer.

7. The method of claim 6 wherein each data coupling transformer includes a primary winding and a secondary winding and said ac coupling step includes the step of coupling the primary winding to the respective physical interface and coupling the secondary winding to the respective twisted pair.

8. The method of claim 1 wherein said first differential signal component coupling step comprises the step of coupling said first differential signal component to a center-tap of a first inductor having respective inductor ends coupled to both wires of said first twisted pair at said first end of said cable, and said second differential signal component coupling step comprises the step of coupling said second differential signal component to a center-tap of a second inductor having respective inductor ends coupled to both wires of said second twisted pair at said first end of said cable.

9. The method of claim 8 wherein said ac coupling step comprises the step of coupling each of said physical interfaces to a corresponding twisted pair via a data coupling transformer, each data coupling transformer having a primary winding coupled to the respective physical interface and a center-tapped secondary winding, wherein said first and second center-tapped inductors correspond to the center-tapped secondary windings of said data coupling transformers.

10. The method of claim 1 further including the step of recovering said first and second differential signal components of said first signal from said first and second twisted pairs respectively at said second end of said cable.

11. The method of claim 10 further including the step utilizing dc power at said second end of said cable corresponding to said first power supply rail and said second power supply rail carried over said first and second twisted pairs and said third and fourth twisted pairs respectively.

12. The method of claim 10 wherein said recovering step comprises the step of recreating said first supervisory signal from said first and second differential signal components.

13. The method of claim 12 wherein said recovering step comprises the step of receiving the first differential signal component of said first supervisory signal on a center-tap of a first inductor having ends that are coupled to both wires of said first twisted pair at said second end of said cable and receiving the second differential component of said first signal on a center tap of a second inductor having ends that are coupled to both wires of said second twisted pair at said second end of said cable.

14. The method of claim 1 wherein said ac coupling step comprises the step of capacitively coupling each of said physical interfaces to both wires of one of said twisted pairs.

15. A circuit for conveying between first and second ends of a cable, at least one supervisory signal and power, said cable including at least first and second twisted pairs for carrying data in accordance with a first communication protocol, said circuit comprising:

first and second physical interfaces coupled to corresponding first and second twisted pairs at said first end of said cable, said first and second physical interfaces being operative to transmit and receive data over the respective twisted pair in accordance with a predetermined data communications protocol, said first and second physical interfaces being dc isolated from the respective twisted pairs;

first and second center-tapped inductors, each having its ends coupled to respective wires of the respective first and second twisted pairs at said first end of said cable; and a first signaling transformer having a primary and a center-tapped secondary, said secondary of said first signaling transformer having first and second ends, a first end of said center-tapped secondary of said first signaling transformer being coupled to a center-tap of said first inductor without being connected to a center-tap of said second inductor and a second end of said center-tapped secondary of said first transformer being coupled to said center-tap of said second inductor without being connected to said center-tap of said first inductor;

said first signaling transformer operative in-response to the coupling of a first signal to the primary of said first signaling transformer to produce a first differential component of said first signal at one end of said center-tapped secondary of said first signaling transformer which is coupled to both wires of said first twisted pair as a common mode signal and to produce a second differential component of said first signal at the other end of said center-tapped secondary of said first signaling transformer which is coupled to both wires of said second twisted pair as a common mode signal.

16. The circuit of claim 15 wherein said cable further includes third and fourth twisted pairs, said circuit further including:

third and fourth center-tapped inductors, each having its ends coupled to respective wires of the respective third and fourth twisted pairs at said first end of said cable; and a second signaling transformer having a primary and a center-tapped secondary, said center-tapped secondary of said second signaling transformer having first and second ends, said first end of said center-tapped secondary of said second signaling transformer being coupled to a center-tap of said third inductor and said second end of said center-tapped secondary of said second transformer being coupled to a center-tap of said fourth inductor;

said second signaling transformer operative in response to the coupling of a second signal to the primary of said first signaling transformer to produce a first differential component of said second signal at one end of said center-tapped secondary of said second signaling transformer, said first differential component of said second signal being coupled to both wires of said third twisted pair as a common mode signal, said second signaling transformer producing a second differential component of said second signal at the other end of said center-tapped secondary of said second signaling transformer which is coupled to both wires of said fourth twisted pair as a common mode signal.

17. The circuit of claim 16 further including a power source having first and second voltage rails, said first voltage rail being coupled to said center-tap of said secondary of said first signaling transformer and said second voltage rail being coupled to said center-tap of said secondary of said second signaling transformer.

18. The circuit of claim 17 further including:

fifth, sixth, seventh and eighth physical interfaces coupled to first, second, third and fourth twisted pairs respectively at said second end of said cable, said fifth, sixth, seventh and eighth physical interfaces being operative to transmit and receive data over the respective twisted pair in accordance with said predetermined data communications protocol, said fifth, sixth, seventh and eighth physical interfaces being dc isolated from the respective twisted pairs;

fifth, sixth, seventh and eighth center-tapped inductors having their respective ends coupled to the wires of the first, second, third and fourth twisted pairs respectively; and third and fourth signaling transformers having a primary and a center-tapped secondary with first and second ends, the first end of said center-tapped secondary of said third signaling transformer being coupled to a center-tap of said fifth inductor, said second end of said center-tapped secondary of said third signaling transformer being coupled to a center-tap of said sixth inductor, said first end of said center-tapped secondary of said fourth signaling transformer being coupled to a center-tap of said seventh inductor and said second end of said center-tapped secondary of said fourth signaling transformer being coupled to a center-tap of said eighth inductor;

said circuit operative in response to the coupling of said first signal to the primary of said first signaling transformer to produce a signal corresponding to said first signal on the primary of said third signaling transformer and, said circuit operative in response to the coupling of said second signal to the primary of said second signaling transformer to produce a signal corresponding to said second signal on the primary of said fourth signaling transformer.

19. The circuit of claim 18 wherein said circuit is operative to provide a voltage on said first and second voltage rails on said center-taps of said secondaries of said third and fourth signaling transformers respectively.

20. The circuit of claim 15 wherein said predetermined data communication protocol comprises gigabit Ethernet.

21. The circuit of claim 15 wherein said predetermined data communication protocol comprises 100 megabit Ethernet.

22. The circuit of claim 15 wherein said predetermined data communication protocol comprises 10 megabit Ethernet.

23. Apparatus for transmitting supervisory signals and providing power over a cable having first and second ends, said cable including first, second, third and fourth twisted pairs, said apparatus comprising:

means for ac coupling physical interfaces operative in accordance with a predetermined protocol to each of said twisted pairs at each end of said cable;

means for generating a first supervisory signal having first and second differential signal components;

means for coupling said first differential signal component to both wires of said first twisted pair at said first end of said cable such that said first differential signal component is superimposed on said first twisted pair as a first common mode signal;

means for coupling said second differential signal component to both wires of said second twisted pair at said first end of said cable such that said second differential signal component is superimposed on said wires of said second twisted pair as a second common mode signal;

means for recovering said first and second differential components of said first supervisory signal from said first and second twisted pairs at said second end of said cable;

means for coupling a first rail of a power supply having first and second voltage rails to both wires of at least one of said twisted pairs at one of said first and second ends of said cable;

means for coupling a second rail of said power supply to both wires of another one of said twisted pairs at said one of said first and second ends of said cable; and means for coupling said first and second power supply rails to a load at other one of said first and second ends of said cable.

24. A system for conveying power and signaling over a cable including four twisted pairs, said system comprising:

first, second third and fourth twisted pairs comprising a communications cable;

a physical interface in electrical communication with each of said twisted pairs at each end thereof;

dc isolators for dc isolating each of said physical interfaces from said twisted pairs;

each physical interface in communication with one of said twisted pairs at one end of said cable being operative to transmit a data signal over the respective twisted pair at a rate of at least 250 megabits per second concurrently with the other physical interfaces at said one end, at least at some times;

first and second magnetic interfaces coupled to both wires of said first and second twisted pairs at first and second points along said cable; and third and fourth magnetic interfaces coupled to both wires of said third and fourth twisted pairs at said first and second points along said cable and spaced from said first and second magnetic interfaces at said first and second points respectively;

said first magnetic interface having a first voltage input, said first magnetic interface being operative to dc couple a first voltage applied to said first voltage input in common mode to both wires of said first twisted pair;

said third magnetic interface having a second voltage input, said third magnetic interface being operative to dc couple a second voltage applied to said second voltage input in common mode to both wires of said third twisted pair;

said second magnetic interface having a first voltage output, said first voltage output being dc coupled in common mode to both wires of said first twisted pair and operative to provide an output voltage approximating said first voltage in response to the application of said first voltage to said first voltage input; and said fourth magnetic interface having a second voltage output, said second voltage output being dc coupled in common mode to both wires of said third twisted pair and operative to provide an output voltage approximating said second voltage in response to the application of said second voltage to said second voltage input.

25. The system of claim 24 wherein each of said magnetic interfaces includes a center-tapped inductor coupled between the wires of the respective twisted pair and the first and second voltage inputs are coupled to center-taps of the respective inductors.

26. The system of claim 24 wherein:

said first magnetic interface is operative to dc couple said first voltage applied to said first voltage input in common mode to both wires of said first twisted pair and to dc couple said first voltage applied to said first voltage input in common mode to both wires of said second twisted pair;

said third magnetic interface is operative to dc couple said second voltage applied to said second voltage input in common mode to both wires of said third twisted pair and to dc couple said second voltage applied to said second voltage input in common mode to both wires of said said fourth twisted pair;

said first voltage output of said second magnetic interface being dc coupled in common mode to both wires of said second twisted pair, and said first voltage output being operative to provide an output voltage approximating said first voltage in response to the application of said first voltage to said first voltage input; and said second voltage output of said fourth magnetic interface being dc coupled in common mode to both wires of said fourth twisted pair, and said second voltage output being operative to provide an output voltage approximating said second voltage in response to the application of said second voltage to said second voltage input.

27. The system of claim 26 wherein each of said magnetic interfaces includes a center-tapped inductor coupled between the wires of the respective twisted pair and the first and second voltage inputs are coupled to center-taps of the respective inductors.

28. The system of claim 24 wherein said DC isolators comprise capacitors.

29. The system of claim 24 wherein said DC isolators comprise transformers.

30. The system of claim 27 wherein:

said first and second magnetic interface including a first transformer having a first winding and a center-tapped second winding, said center-tapped second winding of said first magnetic interface having respective ends coupled to the center-taps of the inductors of the first magnetic interface coupled to the wires of the first and second twisted pairs;

said second magnetic interface including a second transformer having a first winding and a center-tapped second winding, said center-tapped second winding of said second magnetic interface having respective ends coupled to the center-taps of the inductors of the second magnetic interface coupled to the wires of the first and second twisted pairs;

said system operative to produce at said first winding of said second transformer an ac signal approximating an ac signal input to said first winding of said first transformer.

31. The system of claim 30 wherein said ac signal comprises a frequency multiplexed signal including first and second signals having first and second respective carrier frequencies.

32. A system for powering a remote electronic device comprising:

a communication cable having four twisted wire pairs;

power source equipment having first and second voltage rails, said first voltage rail being dc coupled to both wires of first and second ones of said four twisted pairs in common mode and said second voltage rail being dc coupled to both wires of third and fourth ones of said four twisted pairs in common mode;

a signal source for generating an information signal having a data rate of at least one gigabit per second;

a transmit side interface for dividing said information signal into four signals at respective transmit side interface outputs, each of said four data signals having a data rate of at least 250 megabits per second;

first ac couplers for coupling respective transmit side outputs to a respective one of said four twisted pairs at a first location along said cable;

a receive side interface ac coupled to said respective twisted pairs at a second location along said cable spaced from said first location, said receive side interface operative to recover said information signal from said four data signals; and both wires of said first and second twisted pairs being dc coupled to a first power input of an electronic device and both wires of said third and fourth twisted pairs being dc coupled to a second power input of said electronic device to power said electronic device from said power source equipment substantially without interfering with said communication of said four data signals over respective twisted pairs of said cable.

33. A method for providing power over a cable having at least first, second, third and fourth twisted wire pairs comprising:

obtaining an information signal having a data rate of at least 1 gigabit per second;

segmenting said information signal to obtain four signal components each having a data rate of a least 250 megabits per second;

ac coupling each one of said four signal components to a corresponding one of said four twisted wire pairs and transmitting said four signal components over said four twisted wire pairs;

coupling a first magnetic interface to said first twisted wire pair at a first point along said cable and coupling a second magnetic interface to said first twisted wire pairs at a second point along said cable;

coupling a third magnetic interface to said third twisted wire pair at said first point along said cable and coupling a fourth magnetic interface to said third twisted wire pair at said second point along said cable;

dc coupling a first voltage rail having a first dc voltage to both wires of said first twisted wire pair via said first magnetic interface as a first common mode voltage;

dc coupling a second voltage rail having a second dc voltage to both wires of said third twisted wire pair via said third magnetic interface as a second common mode voltage; and obtaining said first and second dc voltages from said second and fourth magnetic interfaces and coupling said first and second dc voltages to an electronic device to power said device.

34. The method of claim 33 further including the steps of:

coupling said first magnetic interface to said second twisted wire pair at said first point along said cable and coupling said second magnetic interface to said second twisted wire pair at said second point along said cable;

coupling said third magnetic interface to said fourth twisted wire pair at said first point along said cable and coupling said fourth magnetic interface to said fourth twisted wire pair at said second point along said cable;

dc coupling said first voltage rail having said first dc voltage to both wires of said second twisted wire pair via said first magnetic interface in common mode;

dc coupling said second voltage rail having said second dc voltage to both wires of said fourth twisted wire pair via said third magnetic interface in common mode; and obtaining said first and second dc voltages from said second and fourth magnetic interfaces and coupling said first and second voltages to said electronic device to power said device.

35. A method for conveying information and power over a communication cable having four twisted wire pairs comprising:

generating an information signal having a first data rate;

in a transmit side interface, segmenting said information signal into four signal components, each of said four signal components having a second data rate approximately one-fourth the data rate of said first data rate, ac coupling at a first coupling point, each of said four signal components to a respective one of said four twisted wire pairs and transmitting each of said signal components over the respective twisted wire pair in accordance with a predetermined communication protocol;

at a second coupling point, dc coupling, in common mode, a first power rail of a power sourcing device to both wires of at least one of said four twisted wire pairs and dc coupling, in common mode, a second power rail of said power sourcing device to both wires of at least another one of said four twisted wire pairs;

at a third coupling point spaced from said second coupling point, dc coupling both wires of a first twisted wire pair to a first voltage input of an electronic device and dc coupling both wires of a second twisted wire pair to a second voltage input of said electronic device to power said electronic device; and at a fourth coupling point, ac coupling said twisted wire pairs carrying said four signal components to a receive side interface and recovering said information signal from said four signal components.

36. The method of claim 35 wherein said first data rate is at least one gigabit per second.

37. The method of claim 36 wherein said predetermined communication protocol is a gigabit Ethernet protocol.

38. The method of claim 37 wherein said dc coupling step at said second coupling point comprises the step of dc coupling the first power rail of said power sourcing device in common mode to both wires of said first twisted wire pair and a third twisted wire pair, and dc coupling the second power rail of said power sourcing device in common mode to both wires of said second twisted wire pair and a fourth twisted wire pair, and said dc coupling step at said third coupling point comprises the step of dc coupling both wires of both said first and third twisted wire pairs to said first voltage input of said electronic device and dc coupling both wires of said second twisted wire pair and said fourth twisted wire pair to said second voltage input of said electronic device to power said electronic device.

39. The method of claim 35 wherein said step of dc coupling said first and second power rails to both wires of respective first and second twisted wire pairs at said second coupling point comprises the step of coupling said first and second power rails to center-taps of respective first and second center-tapped inductors and coupling each end of said first and second center-tapped inductors to one of the wires of respective first and second twisted wire pairs, and said step of dc coupling both wires of said first and second twisted wire pairs to first and second voltage inputs of said electronic device at said third coupling point comprises the step of dc coupling both wires of said first twisted wire pair to ends of a third center-tapped inductor and dc coupling a center-tap of said third center-tapped inductor to said first voltage input, and dc coupling both wires of said second twisted wire pair to ends of a fourth center-tapped inductor and dc coupling a center-tap of said fourth center-tapped inductor to said second voltage input.

40. The method of claim 35 wherein said step of ac coupling each one of said four signal components to a respective one of said four twisted wire pairs at said first coupling point comprises the step of capacitively coupling said four signal components to said four twisted wire pairs, and said step of ac coupling said four twisted wire pairs to said receive side interface at said second coupling point comprises the step of capacitively coupling said four twisted wire pairs to said receive side interface.

41. The method of claim 35 wherein said step of ac coupling each one of said four signal components to a respective one of said four twisted wire pairs at said first coupling point comprises the step of transformer coupling said four signal components to said four twisted wire pairs, and said step of ac coupling said four twisted wire pairs to said receive side interface at said second coupling point comprises the step of transformer coupling said four twisted wire pairs to said receive side interface.

42. The method of claim 35 wherein said first and second coupling points are located substantially at the same point along said cable.

43. The method of claim 35 wherein said third and fourth coupling points are located substantially at the same point along said cable.

44. The method of claim 35 wherein said first coupling point is spaced along said cable from said second coupling point.

45. The method of claim 35 wherein said third coupling point is spaced along said cable from said fourth coupling point.

* * * * *

UNITED STATES PATENT AND TRADEMARK OFFICE
CERTIFICATE OF CORRECTION

| | | |
|---|---|---|
| PATENT NO. | : 7,656,956 B2 | Page 1 of 1 |
| APPLICATION NO. | : 11/251383 | |
| DATED | : February 2, 2010 | |
| INVENTOR(S) | : King | |

It is certified that error appears in the above-identified patent and that said Letters Patent is hereby corrected as shown below:

In Column 2, Line 29, delete "volage" and insert -- voltage --, therefor.

In Column 8, Line 18, in Claim 1, delete "wires of" insert -- wires of said --, therefor.

In Column 8, Line 21, in Claim 1, delete "wires of said" insert -- wires of said second --, therefor.

In Column 9, Line 52, in Claim 13, delete "center tap" and insert -- center-tap --, therefor.

In Column 10, Line 18, in Claim 15, delete "in-response" and insert -- in response --, therefor.

In Column 12, Line 13, in Claim 24, delete "second" and insert -- second, --, therefor.

In Column 13, Line 4, in Claim 26, delete "said said fourth" and insert -- said fourth --, therefor.

Signed and Sealed this
Seventeenth Day of July, 2012

David J. Kappos
*Director of the United States Patent and Trademark Office*